United States Patent [19]

Gerry

[11] 4,227,817

[45] Oct. 14, 1980

[54] FUEL AND WATER HOMOGENIZATION MEANS

[76] Inventor: Martin E. Gerry, 13452 Winthrope St., Santa Ana, Calif. 92705

[21] Appl. No.: 972,953

[22] Filed: Dec. 26, 1978

[51] Int. Cl.³ ............................................. B01F 11/02
[52] U.S. Cl. ................................. 366/127; 123/25 E; 123/536; 261/18 A; 261/DIG. 48
[58] Field of Search .............. 366/127, 116; 123/25 E, 123/25 A, 25 R, 119 E, 141, 148 BA; 261/18 A, DIG. 48; 310/317, 325

[56] References Cited

U.S. PATENT DOCUMENTS

| | | | |
|---|---|---|---|
| 2,453,595 | 11/1948 | Rosenthal | 310/317 |
| 3,191,913 | 6/1965 | Mettler | 366/127 |
| 3,198,489 | 8/1965 | Finch | 366/127 |
| 3,301,535 | 1/1967 | Brown | 366/127 |
| 3,818,876 | 6/1974 | Voogd | 123/25 E |
| 4,029,064 | 6/1977 | Oehley | 123/119 E |
| 4,054,848 | 10/1977 | Akita | 310/317 |

Primary Examiner—Robert W. Jenkins

[57] ABSTRACT

A system for providing homogenized mixtures of hydrocarbon fuel and water utilizes a chamber in which the fuel and water is injected in a predetermined ratio. The chamber contains a transducer which is electrically excited and therefore vibrates the mixture at high frequency rates so as to homogenize it prior to the mixture being fed to a fuel injector or carburetor.

9 Claims, 1 Drawing Figure

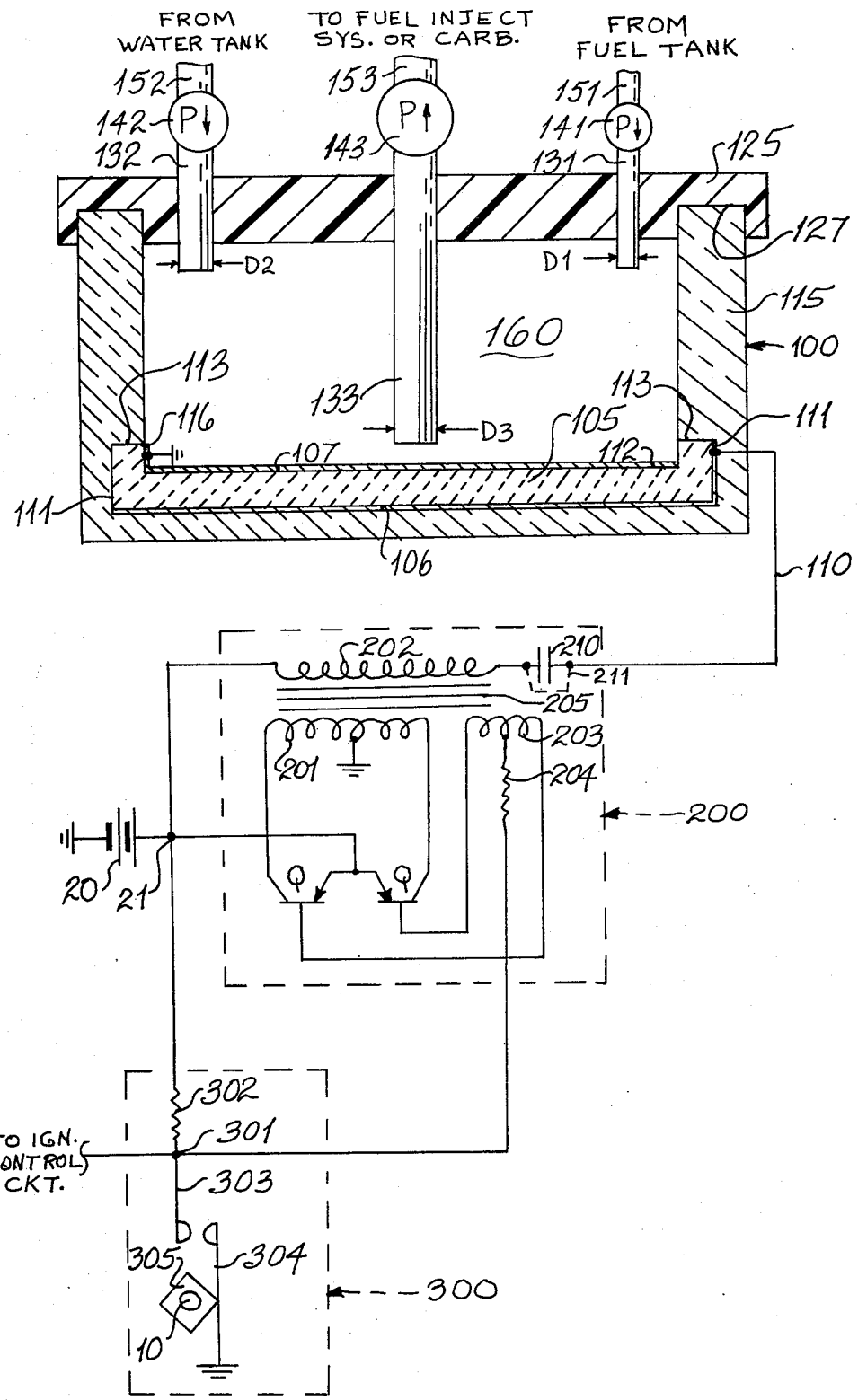

FUEL AND WATER HOMOGENIZATION MEANS

BACKGROUND OF THE INVENTION

This invention is in the field of fuels for an internal combustion engine and substances mixed homogeneously with the fuels to reduce the quantity of fuel consumed by such engine.

Knowledge of the electrical features of this invention are limited, and the extent of the knowledge in the prior art is referred to in the text of the detailed description below.

The homogenizing of fuel and water so as to reduce usage of hydrocarbon fuels and method of practically achieving such result is not known.

SUMMARY OF THE INVENTION

Therefore, it is an objective of this invention to disclose a practical method of feeding fuel and water to a chamber in desired proportions and homogenizing the mixture in such chamber so that there will be a synergistic effect between the components and subcomponents of the fuel and water when same is utilized by injection of the homogenized mixture into the engine.

The system providing this objective, has an AC power source and homogenizing means connected to the power source. The homogenizing means includes a transducer of piezoelectric material selected from the group consisting substantially of barium titanate, lead zirconate titanate, lead metaniobate or mixtures thereof. The transducer has electrically conductive coatings, one on each major face thereof, and the AC power source is connected to such coatings. A method for metering the proper ratio of water to fuel is provided as integral with the homogenizing means, and other means are provided to pass the homogenized mixture to either a fuel injector or carburetor feeding the engine.

The AC source has a transformer output which is coupled either directly or through a capacitor to the transducer. Such source uses Darlington oscillator stages to obtain high voltage and current output to feed the transducer, and a method utilizing existing timing means in the engine system is used to pulse the AC source on and off so as to create transients as well as reduce the duty cycle thereof and therefore increases reliability of the AC source.

BRIEF DESCRIPTION OF THE DRAWING

The FIGURE is an electromechanical schematic showing the combined electrical and non-electrical features of the system in accordance with the invention.

DETAILED DESCRIPTION

Referring to the FIGURE, a system providing a homogenized mixture of fuel and water prior to feeding such mixture to a fuel burning engine, is disclosed.

Enclosure 100 includes body 115 shown as being made of transparent material such as glass, but could be made of any electrically non-conductive material which will not react with gasoline such as a variety of thermoset plastics. Body 115 has a recess 116 therein circumferential the inner surface of the body for retaining transducer member 105 therein. The transducer member may be molded to the plastic substance of of body 115, in a manner so as not to prevent piezoelectric transducer 105 from vibrating when a voltage of high frequency or high repetition rate is impressed across its conductively coated faces 111 and 112. The material of the piezoelectric member 105 may be for example either barium titanate, lead zirconate titanate or lead metaniobate or mixtures thereof. Edge 113 of transducer 105 is not electrically coated so that in effect the two conductive coatings on faces 111 and 112 will form an electrical capacitor with the material of member 105 therebetween. Coating on face 111 is shown as layer 106 and coating on face 112 as layer 107, may be of any electrical conductor such as copper, silver, gold or aluminum.

Although the shape of member 105 is shown in dish-form member 105 may be of any shape, such as being flat, to lend itself to being attached or held to body 115, such as by mechanical means, or by a suitable epoxy resin attaching face 111 to the inner surface of body 115.

A cover 125, generally made of a plastic or synthetic resin is attached by means, not shown, being either screwed or snapped on to the top of body 115 at 127. Such cover has three different diameter apertures therein to admit pipes 131, 132 and 133 having diameters D1, D2 and D3 respectively. Such pipes could be made of a plastic which does not react with engine fuel such as gasoline or of a metal such as stainless or ordinary steel. Pipe 131 may be connected to pump 141, which has an input feed pipe 151 of same diameter as 131, from the fuel tank supplying fuel to the engine. Pipe 132 may be connected to pump 142, which has an input feed pipe 152 of same diameter as 132, from a water tank source, and pipe 133 may be connected to output pump 143, which has an output pipe 153 feed of like diameter as pipe 133, to either the fuel injection system or the carburetor feeding the homogenized fuel and water to the engine in vapor form.

The diameters of the pipes, D1 and D2, will in this illustration control the quantity of fuel and water ratios present within chamber 160 formed in body 115. Since the ratio of fuel and water to be homogenized in chamber 160 will be proportional to the ratio of inner areas of pipes 131 and 132, and assuming the same pipe wall thicknesses, such ratio will be proportional to the ratio of their diameters squared. Further assuming that we wish to have 10 times as much water as fuel in the homogenized mixture, then:

$$\frac{D2^2}{D1^2} = 10$$

and if we arbitrarily select a pipe diameter D2 of 0.4 inches, then D1 will need to be 0.2 inches to satisfy the assumed requirements.

If we further assume that the homogenized mixture of fuel and water is used up by the engine as rapidly as it is fed to means 100, then the diameter D3 of pipes 133 and 153, assuming the same wall thicknesses as D2 and D1 situation, will follow the relationship of:

$$D3^2 = D2^2 + D1^2; \text{ or }$$
$$D3 = \sqrt{D2^2 + D1^2}$$

For the diameters of D2 and D1 as above stated, then D3 under these conditions will be about 0.45 inches.

It is of course understood that the system described is not the only way to premix desired ratios of fuel and water and to feed the homogenized mixture to the engine. A system of computer controlled valves from the respective fuel and water tanks can be used for such purpose if desired, and of course would be more expensive and more complex than the one illustrated. It can also be appreciated that the system illustrated or one similar to it can be used to premix and therefore pre-homogenize fuel and water, and such pre-homogenized mixture sold to the consumer by the oil companies from their conventional supply pumps as used in a gasoline dispensing station.

In this system, the conventional ground symbol is used throughout to indicate the negative potential of battery 20 as well as a common electrical return path for DC and AC currents, and such return paths need not be referred to in the spcification that follows, as same would be understood.

AC power generation circuit 200, although fully illustrated, is a modification of a circuit that may be found in a publication entitled, Magnetic Tape Cores, Bulletin TC-103B, copyrighted 1972 and published by Arnold Engineering Company of Marengo, Ill. at pages 45 and 46 thereof and including schematic FIG. 22 therein. Generator 200 as modified improves the reliability of such circuit by deleting the diodes therein, by intermittent pulsing bias winding 203 through bias resistor 204 by virtue of connecting such to terminal 301 of timer 300, and by utilizing Darlington transistor circuits Q of the PNP type such as 2N6287, which provide a substantially higher voltage across winding 201 and consequently across output winding 202 for enabling such voltage to be fed either through capacitor 210, when jumper wire 211 is removed, to transducer 115 across the electrically conductive layers on surfaces 111 and 112, by making electrical connection of wire 110 from the outuput of AC source 200 to the conductive layer on face 111 and connecting the conductive layer on face 112 to ground. If an increase of effective capacitance is desired, then jumper wire 211 is connected as shown so that capacitor 210 is no longer in series with the effective capacitance presented by the transducer. Of course the positive terminal at 21 of battery 20 is connected so as to power transistors Q, to one end of winding 202, and is used to provide a positive potential to timer 300.

Core 205 of the transformer of the AC system is of special significance, and large charges can be experienced and consequently high voltage and currents obtained by utilizing cores of laminations which are made from cold rolled steel, relay steel or soft iron.

Timer 300 is conventional in automotive ignition systems, and exemplary of a variety of such timers, and may be used to intermittenly feed DC power to generator 200 to start it oscillating, rather than feeding DC power to such generator continuously. This has the advantage of maintaining generator 200 on, about half the operating time, providing a high transient current and voltage output from such generator and improving the reliability of the generator by maintaining it cool. Such timer has positive DC from battery 20 fed to it through resistor 302 to terminal 301, which terminal 301 is connected so as to provide a pulsing input to bias resistor 204 which switches generator 200 on, whenever contacts 303 and 304 are closed by action of cam 305 driven by distributor shaft 10 of the engine. When the high portion of cam 305 does not cooperate with contactor 304, contactors 304 and 305 are closed and terminal 301 is at ground potential which is the appropriate bias potential to turn transistors Q to their oscillatory mode through feedback winding 203 connected to the bases of these Qs.

When a high portion of cam 305 cooperates with contactor 304, as shown in the FIGURE, then contactors 303 and 304 will be open and not cooperate, and consequently terminal 301 will be at positive DC potential, turning off transistors Q because PNP transistors Q will not have bias current and consequently not have collector current flowing when their bases are biased with positive DC potential.

It is pointed out as a matter of interest, that terminal 301 can simultaneously be utilized, utilizing timer 300 to control another circuit similar to circuit 200 which can be used to simultaneously supply high ignition energy to the electrically activated igniters of the engine.

It should be noted that experiments involving the homogenizing of lubricating oil and water by use of a vessel having a barium titanate transducer element in it connected to a 200 KHz power source, that water and lubricating oil such as used in automotive engines, homogenized, and stayed homogenized without separation for at least a week. The use of gasoline for example, to homogenize with water would be substantially simpler and require less electrical power and agitation for the molecular structures comprising gasoline and water, to enable homogenization to occur instantly. The result of feeding the homogenized mixture instead of fuel only, would provide additional synergism wherein the molecular structure of water will probably break down under high energy ionization of the mixture by a high energy ignition system, so that the hydrogen component of water will actively combine with the hydrocarbon components of the fuel, and the oxygen component of the water will support the combusion of the combination of hydrocarbon components and hydrogen components to obtain more energy from each unit quantity of homogenized mixture as compared with the same unit quantity of the fuel alone.

What is claimed is:

1. A system supplied by metered sources of liquid fuel and water for homogenizing said fuel and water and feeding the homogenized fuel and water in its liquid state to vaporization means of an engine, comprising the combination of:

an AC power source;
homogenizing means, having a first feeder line connected to the source of liquid fuel and a second feeder line connected to the source of water, for receiving said liquid fuel and water in metered quatitites, said homogenizing means including transducing means retained within and being part of said homogenizing means, said transducing means being connected directly to the AC power source for converting AC power from said AC power source to vibrations so as to produce a homogenized liquid of said liquid fuel and water; and
means, coupling said homogenizing means to said vaporization means, for transferring said homogenized liquid only to said vaporization means.

2. The invention as stated in claim 1, wherein the transducing means comprises a compound of piezoelectric material selected from the group consisting substantially of barium titanate, lead zirconate titanate, lead metaniobate or mixtures thereof.

3. The invention as stated in claim 1, wherein said homogenizing means includes an enclosure which retains the transducing means.

4. The invention as stated in claim 3, wherein said enclosure has means for supplying the fuel and water thereto in predetermined ratio, and means for feeding the homogenized mixture of said fuel and water as output therefrom.

5. The invention as stated in claim 1, wherein said transducing means has a coating of electrically conductive material on each of its two major faces for making electrical connection of the power source thereto.

6. The invention as stated in claim 1, wherein said AC power source has Darlington oscillator stage circuits.

7. The invention as stated in claim 1, including timing means, coupled to the AC power source, for intermittently energizing and deenergizing said source.

8. The invention as stated in claim 1, wherein said AC power source has an output transformer electrically coupled to said transducing means.

9. The invention as stated in claim 1, wherein said AC power source has an output transformer having an output winding in series with a capacitor electrically connected to the transducing means.

* * * * *